United States Patent
Trumbower et al.

[11] Patent Number: 5,927,891
[45] Date of Patent: Jul. 27, 1999

[54] BOOT SEAL FOR A BALL AND SOCKET JOINT

[75] Inventors: John W. Trumbower, Lyons; Timothy J. Hengesbach, Portland, both of Mich.

[73] Assignee: TRW Inc., Lyndhurst, Ohio

[21] Appl. No.: 08/919,723

[22] Filed: Aug. 28, 1997

[51] Int. Cl.⁶ .................................................. F16C 11/06
[52] U.S. Cl. ........................ 403/114; 403/122; 403/135
[58] Field of Search .................................. 403/114, 122, 403/134, 113, 115, 135, 132, 137, 112

[56] References Cited

U.S. PATENT DOCUMENTS

| | | |
|---|---|---|
| 3,343,857 | 9/1967 | Cislo . |
| 4,332,500 | 6/1982 | Smith, Jr. et al. . |
| 4,974,985 | 12/1990 | Glatzel . |
| 4,988,324 | 1/1991 | Ryan et al. ........................ 403/114 X |
| 5,002,419 | 3/1991 | Eustache . |
| 5,609,433 | 3/1997 | Pazdirek et al. ..................... 403/135 X |

*Primary Examiner*—Anthony Knight
*Assistant Examiner*—John R. Cottingham
*Attorney, Agent, or Firm*—Tarolli, Sundheim, Covell, Tummino & Szabo

[57] ABSTRACT

A ball stud (30) has a ball end (32) received in a socket (60) to form a ball and socket joint (20). A boot seal (10) has a first end portion (82) for encircling and sealingly engaging a portion (78) of the socket (60). The boot seal (10) has a second end portion (84) which defines an opening (94) through which the ball stud (30) extends. The second end portion (84) of the boot seal (10) has portions (140, 150, 160, 170) which permit relative angular movement of the ball stud (30) and the socket (60) in a first direction (A) and block relative angular movement of the ball stud and the socket in a second direction (C).

16 Claims, 4 Drawing Sheets

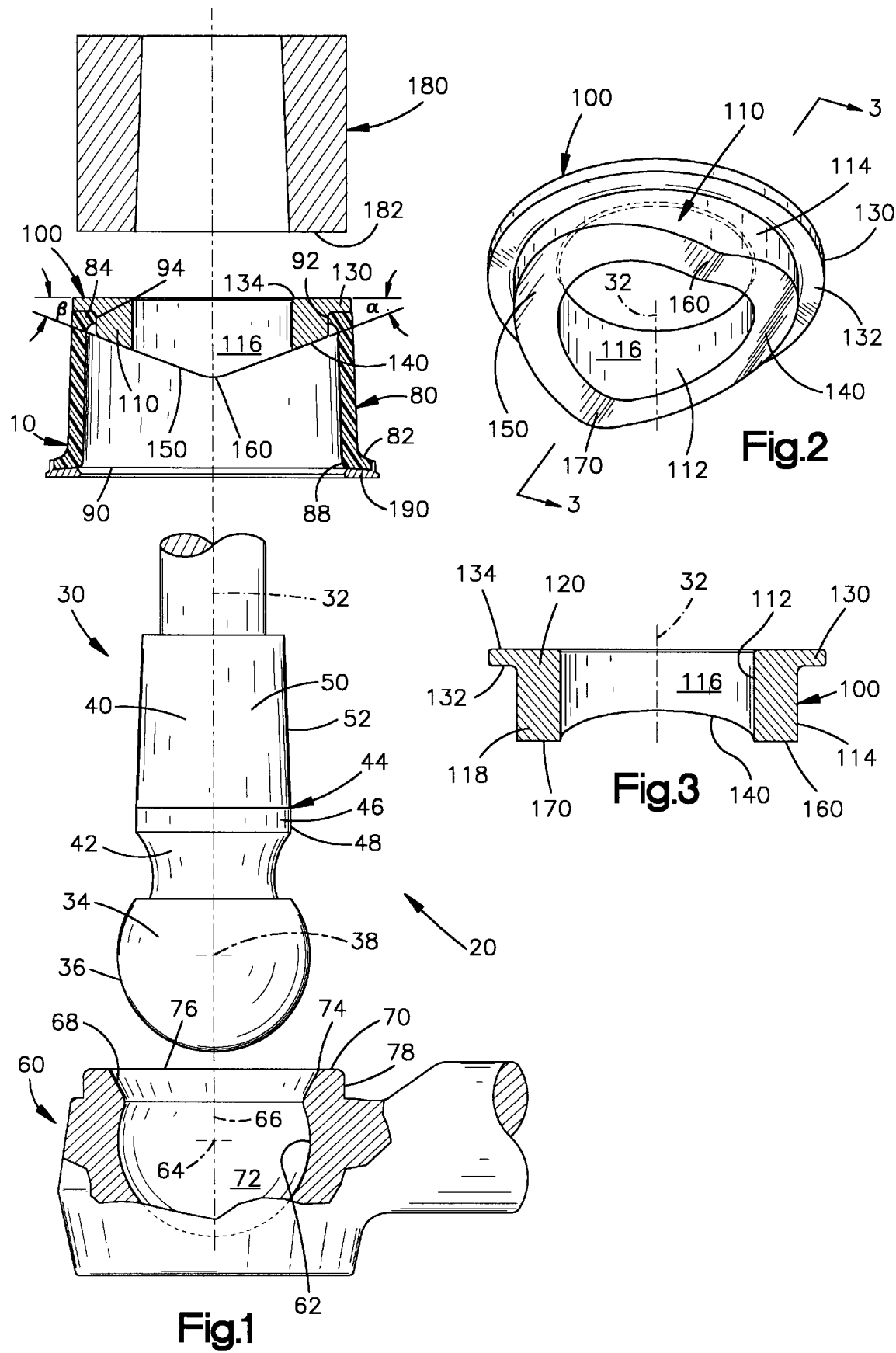

BOOT SEAL FOR A BALL AND SOCKET JOINT

BACKGROUND OF THE INVENTION

1. Technical Field

The present invention relates to ball and socket joints, and is particularly directed to a boot seal for use with a ball and socket joint.

2. Description of the Prior Art

Ball and socket joints provide an articulated connection between two relatively movable members. Ball and socket joints are commonly used in vehicle suspension systems and in vehicle steering systems.

A typical ball and socket joint comprises a ball stud with a spherical ball end and a socket member with a spherical socket for receiving the ball end. The joint is usually lubricated with grease to provide low friction relative movement of the ball end and the socket member. In order to retain the lubricant within the joint and to prevent entry of a contaminant, such as dirt, that might damage the joint, a boot seal typically surrounds the joint.

In certain applications, it is desirable to control the motion of a ball and socket joint. For example, it may be desirable to restrict one or more directions of pivotal movement of a ball and socket joint on a drag link associated with a vehicle steering system. The present invention provides an apparatus for performing such a function.

SUMMARY OF THE INVENTION

The present invention is an apparatus comprising a ball stud having a ball end, a socket for receiving the ball end to form a ball and socket joint, and a boot seal having a first end portion for encircling and sealingly engaging a portion of the socket. The boot seal has a second end portion which defines an opening through which the ball stud extends. The second end portion of the boot seal has first means for permitting relative angular movement of the ball stud and the socket in a first direction and second means for blocking relative angular movement of the ball stud and the socket in a second direction.

The boot seal includes an annular insert disposed in the opening in the second end portion of the boot seal. The insert has a surface that defines a bore and that sealingly engages the ball stud. The insert is fixedly secured to the boot seal and is fixed for movement with the ball stud.

The insert includes a main body portion having first and second axial end portions. The second axial end portion has a planar end surface. The first axial end portion includes a first stop surface lying in a first plane which extends at an angle to the planar end surface and a second stop surface lying in a second plane which extends at an angle to the planar end surface.

The main body portion of the insert includes first and second bearing surfaces which are co-planar. The first stop surface intersects the second stop surface at the first and second bearing surfaces.

The first means comprises the first and second stop surfaces on a rigid portion of the insert. The first and second stop surfaces permit a predetermined amount of relative angular movement of the ball stud and the socket in the first direction. The second means comprises the first and second bearing surfaces on said rigid portion of the insert. The first and second bearing portions are engageable with surface portions of the socket to block the relative angular movement of the ball stud and the socket in the second direction.

BRIEF DESCRIPTION OF THE DRAWINGS

Further features of the present invention will become apparent to those skilled in the art to which the present invention relates from reading the following description with reference to the accompanying drawings, in which:

FIG. 1 is an exploded side view, taken partly in section, of components of a ball and socket joint constructed in accordance with the present invention;

FIG. 2 is a perspective view of one component of the ball and socket joint of FIG. 1;

FIG. 3 is a view taken along line 3—3 in FIG. 2;

DESCRIPTION OF A PREFERRED EMBODIMENT

Figure 4:
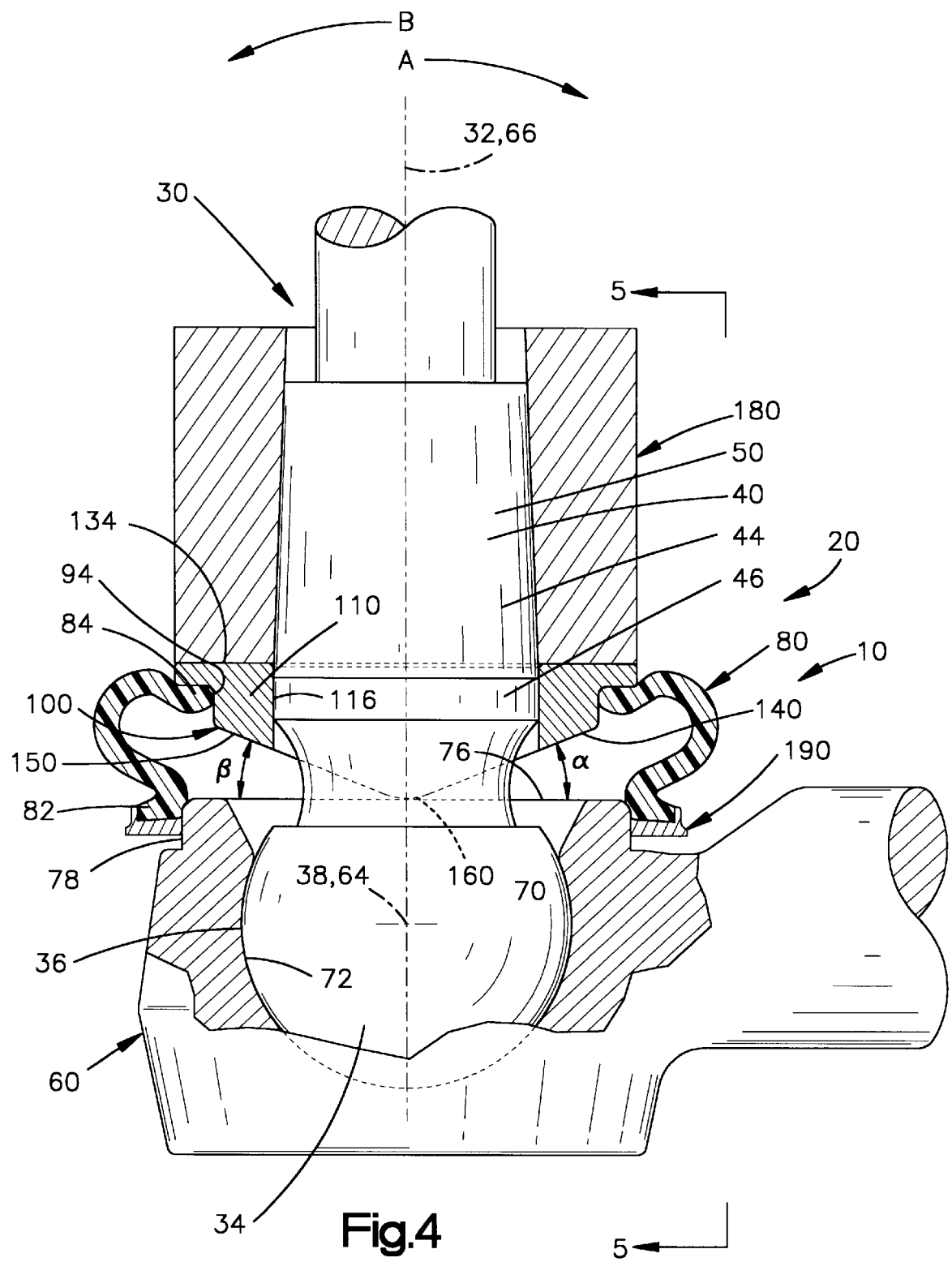
FIG. 4 is a view of the ball and socket joint of FIG. 1 shown in an assembled condition.

The present invention relates to ball and socket joints, and is particularly directed to a boot seal for use with a ball and socket joint. The present invention is applicable to various ball and socket constructions. As representative of the present invention, FIG. 1 illustrates a boot seal 10 which forms a part of a ball and socket joint 20. The ball and socket joint 20 comprises a metal ball stud 30, a metal socket member 60, and the boot seal 10.

The ball stud 30 has an elongate configuration centered on a longitudinal central axis 32 of the ball stud. The ball stud 30 includes a ball end 34. The ball end 34 has a substantially spherical outer surface 36 centered on a pivot center 38. The pivot center 38 is located on the axis 32.

The ball stud 30 includes a shank 40 which extends from the ball end 32. The shank 40 includes a concave connecting section 42. The shank 40 further includes a collar section 44 adjacent to the connecting section 42. The collar section 44 has a first portion 46 with a cylindrical outer surface 48 and a second portion 50 with a frustoconical outer surface 52.

The socket member 60 has a spherical inner surface 62 centered on a pivot center 64. The pivot center 64 lies on an axis 66 of the socket member 60. An annular chamfered surface 68 extends between the spherical inner surface 62 and an outer end surface 70 of the socket member 60. The outer end surface 70 extends perpendicular to the axis 66. The spherical inner surface 62 and the chamfered surface 68 define a socket 72 in the socket member 60.

A circular edge 74 on the socket member 60, formed by the intersection of the chamfered surface 68 and the outer end surface 70, defines an opening 76 into the socket 72. The outer end surface 70 of the socket member 60 extends circumferentially about the opening 76. An annular shoulder surface 78 of the socket member 60 is disposed radially outward of the outer end surface 70. The shoulder surface 78 extends axially, in a downward direction as viewed in FIG. 1, from the outer end surface 70.

The boot seal 10 has two components, that is, a flexible body member 80 and a rigid insert 100. The body member 80 (FIG. 1) is made from neoprene or another suitable material. The insert 100 is preferably made from a metallic material, but could also be made of a hard plastic material. The insert 100 is fixedly attached to the body member 80, preferably by molding the insert into the body member.

The body member 80 of the boot seal 10 has a generally tubular configuration centered on the axis 32 of the ball stud 30. The body member 80 has first and second opposite end portions 82 and 84, respectively. The first end portion 82 of the body member 80 includes a first inner surface 88 which defines a first opening 90 in the body member of the boot seal 10. The second end portion 84 of the body member 80 has a second inner surface 92 which defines a second opening 94 in the body member of the boot seal 10.

The insert 100 (FIGS. 2 and 3) has a main body portion 110 and a flange portion 130. The main body portion 110 of the insert 100 is configured as a portion of a hollow cylinder centered on the axis 32 of the ball stud 30. The main body portion 110 of the insert 100 has parallel, cylindrical inner and outer side surfaces 112 and 114, respectively, which are centered on the axis 32 (FIGS. 2 and 3). The inner side surface 112 of the insert 100 defines a cylindrical bore 116 which extends axially through the main body portion 110 of the insert. The main body portion 110 of the insert 100 has first and second opposite axial end portions 118 and 120, respectively (FIG. 3).

The flange portion 130 of the insert 100 extends radially outward from the second axial end portion 120 of the main body portion 110 of the insert. The flange portion 130 of the insert 100 has an annular sealing surface 132 which extends radially outward from the cylindrical outer surface 114 of the main body portion 110 of the insert. The insert 100 is molded with the body member 80 so that the main body portion 110 of the insert is at least partially disposed in the second opening 94 in the second end portion 84 of the body member. The second end portion 84 of the body member 80 is molded or attached by other means to the sealing surface 132 of the insert 100 and is in sealing engagement with the cylindrical outer surface 114 of the insert.

A planar end surface 134 of the insert 100 extends along the flange portion 130 and along the main body portion 110 of the insert. The end surface 134 is perpendicular to the inner and outer surfaces 112 and 114, respectively, of the main body portion 110 of the insert 100.

The first axial end portion 118 of the main body portion 110 of the insert 100 has planar first and second stop surfaces 140 and 150, respectively. The first and second stop surfaces 140 and 150 provide the first axial end portion 118 of the insert 100 with a generally V-shaped configuration as viewed in FIGS. 1 and 4. The first stop surface 140 has a semi-elliptical configuration which extends circumferentially about the axis 32 between first and second bearing surfaces 160 and 170, respectively. The first and second bearing surfaces 160 and 170 lie on a common line which extends through the axis 32. The first stop surface 140 also extends generally radially between the cylindrical inner and outer surfaces 112 and 114 of the main body portion 110 of the insert 100. The first stop surface 140 lies in a plane which extends at an angle $\alpha$ (FIG. 1) to the end surface 134 of the insert 100. In the illustrated embodiment, the angle $\alpha$ is approximately 18°.

The insert 100 is symmetrical about an axial plane extending through the first and second bearing surfaces 160 and 170. The second stop surface 150 intersects the first stop surface 140 at the first and second bearing surfaces 160 and 170. The second stop surface 150 is thus a mirror image, about the first and second bearing surfaces 160 and 170, of the first stop surface 140.

The second stop surface 150 has a semi-elliptical configuration which extends circumferentially about the axis 32 between the first and second bearing surfaces 160 and 170. The second stop surface 150 extends generally radially between the cylindrical inner and outer surfaces 112 and 114 of the main body portion 110 of the insert 100. The second stop surface 150 lies in a plane which extends at an angle $\beta$ to the end surface 134 of the insert 100. The angle $\beta$ is equal to the angle $\alpha$. Thus, in the illustrated embodiment, the angle $\beta$ is approximately 18°.

In the assembled condition of the ball and socket joint 20, the ball stud 30 (FIG. 4) extends through the opening 76 in the socket member 60. The ball end 34 is located in the socket 72. The pivot center 38 of the ball end 34 is coincident with the pivot center 64 of the socket member 60. The spherical outer surface 36 of the ball end 34 is in sliding engagement with the spherical inner surface 62 of the socket member 60.

The boot seal 10 is assembled in the ball and socket joint 20 in a manner so as to seal between the ball stud 30 and the socket member 60. The first portion 46 of the collar section 44 of the shank 40 of the ball stud 30 is closely received in the bore 116 of the main body portion 110 of the insert 100. The bore 116 in the insert 100 provides support for rotation of the ball stud 30 and acts as a seal against the first portion 46 of the ball stud. The shank 40 of the ball stud 30 extends through the second opening 94 in the second end portion 84 of the body member 80 of the boot seal 10.

A mating part 180 is pressed axially onto the second portion 50 of the collar section 40 of the ball stud 30. A radially extending end surface 182 (FIG. 1) of the mating part 180 engages the end surface 134 of the insert 100. The mating part 180 helps to maintain the axial location of the boot seal 10 relative to the ball stud 30.

The first end portion 82 of the body member 80 of the boot seal 10 encircles and seals against the shoulder surface 78 of the socket member 60. The first end portion 82 of the body member 80 is held in place on the socket member 60 either by friction or by an optional band clamp 190 (FIG. 4).

Figure 5:
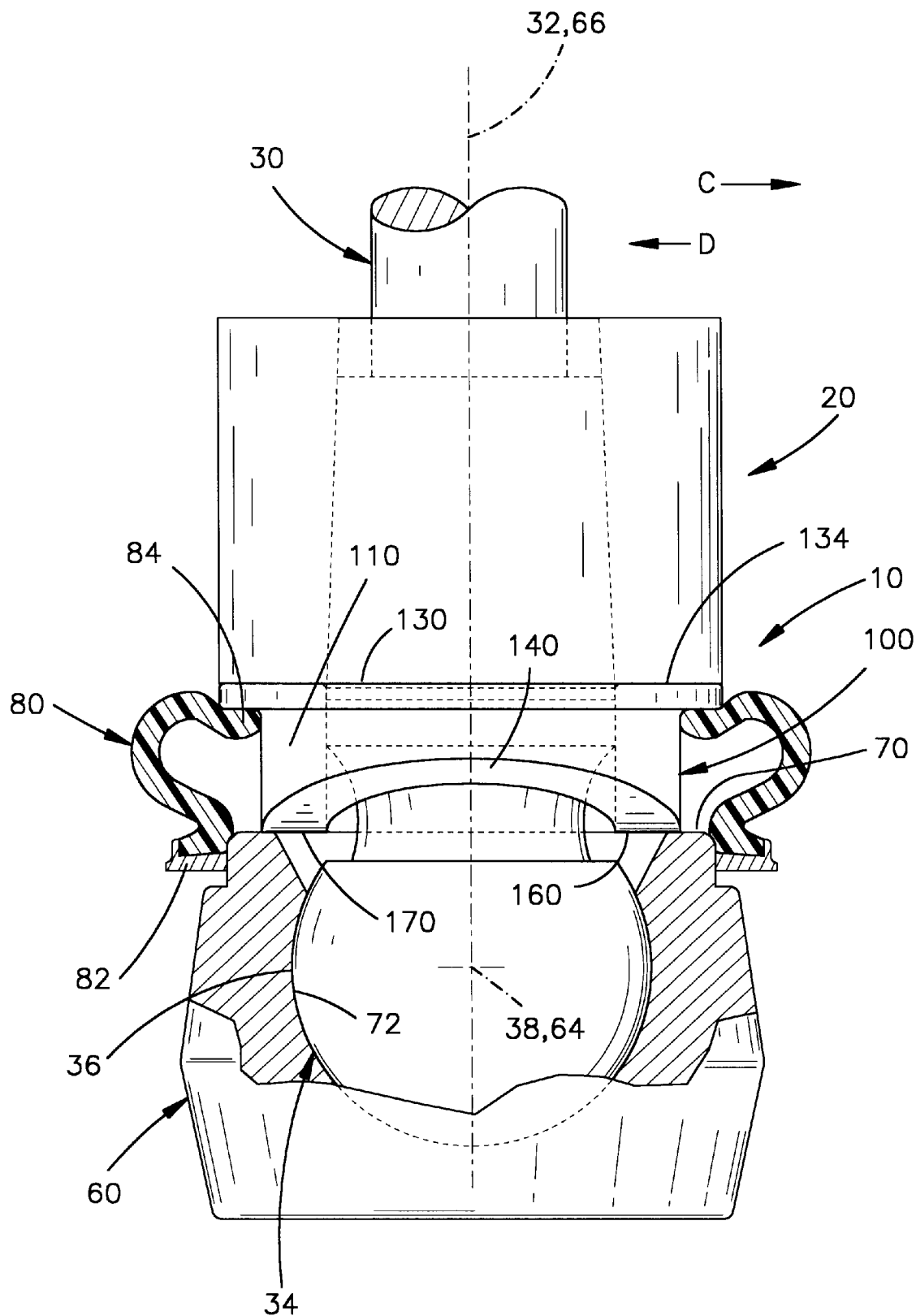
FIG. 5 is a view taken along line 5—5 in FIG. 4.

FIG. 4 illustrates the components of the ball and socket joint 20 in a first, or aligned, condition. The axis 32 of the ball stud 30 is coincident with the axis 66 of the socket member 60. The first and second stop surfaces 140 and 150 of the boot seal insert 100 extend at their respective predetermined angles $\alpha$ and $\beta$ to the end surface 134 of the insert 100. In the condition of FIG. 4, the end surface 134 of the insert 100 is parallel to the outer end surface 70 of the socket member 60. Thus, the first and second stop surfaces 140 and 150 also extend at their predetermined angles $\alpha$ and $\beta$, respectively, to the outer end surface 70 of the socket member 60. The first and second bearing surfaces 160 and 170 of the insert 100 are adjacent to and bear against the outer end surface 70 of the socket member 60. The flexible body member 80 has a bowed shape as seen in FIGS. 4 and 5.

When external forces, such as forces of a vehicle steering or suspension system, act on the ball and socket joint 20, the ball stud 30 pivots relative to the socket member 60. As this occurs, the boot seal 10 including the insert 100 controls the motion of the ball and socket joint 20. Specifically, the configuration of the insert 100 permits the ball stud 30 to move angularly (or pivot) in a direction indicated by the arrow A (FIG. 4) from the position shown in FIG. 4 to the position shown in FIG. 6. The ball stud 30 is freely pivotable in the direction A, about the pivot centers 38 and 64, until the first stop surface 140 of the insert 100 comes into contact with the outer end surface 70 of the socket member 60. When the first stop surface 140 on the insert 100 engages the outer end surface 70 of the socket member 60 (FIG. 6), further pivotal movement of the ball stud 30 in the direction A is blocked. The predetermined angle $\alpha$ between the first stop surface 140 on the ball stud 30 and the outer end surface 70 of the socket member 60 determines and limits the amount of angular movement of the ball stud 30 that is permitted. The angle α is therefore the resulting angle between the axis 32 of the ball stud 30 and the axis 66 of the socket member 60 at maximum pivotal movement in the direction A, as may be seen in FIG. 6.

The symmetrical design of the insert 100 enables the ball stud 30 to be pivoted relative to the socket member 60 in a direction indicated by the arrow B (FIG. 4) opposite the direction A. Such pivotal movement is not shown in the drawings. The ball stud 30 is freely pivotable in the direction B relative to the socket member 60 until the second stop surface 150 of the ball stud 30 engages the outer end surface 70 of the socket member 60. The predetermined angle β between the second stop surface 150 and the outer end surface 70 of the insert 100 determines the amount of available pivotal movement in the direction B.

Figure 6:
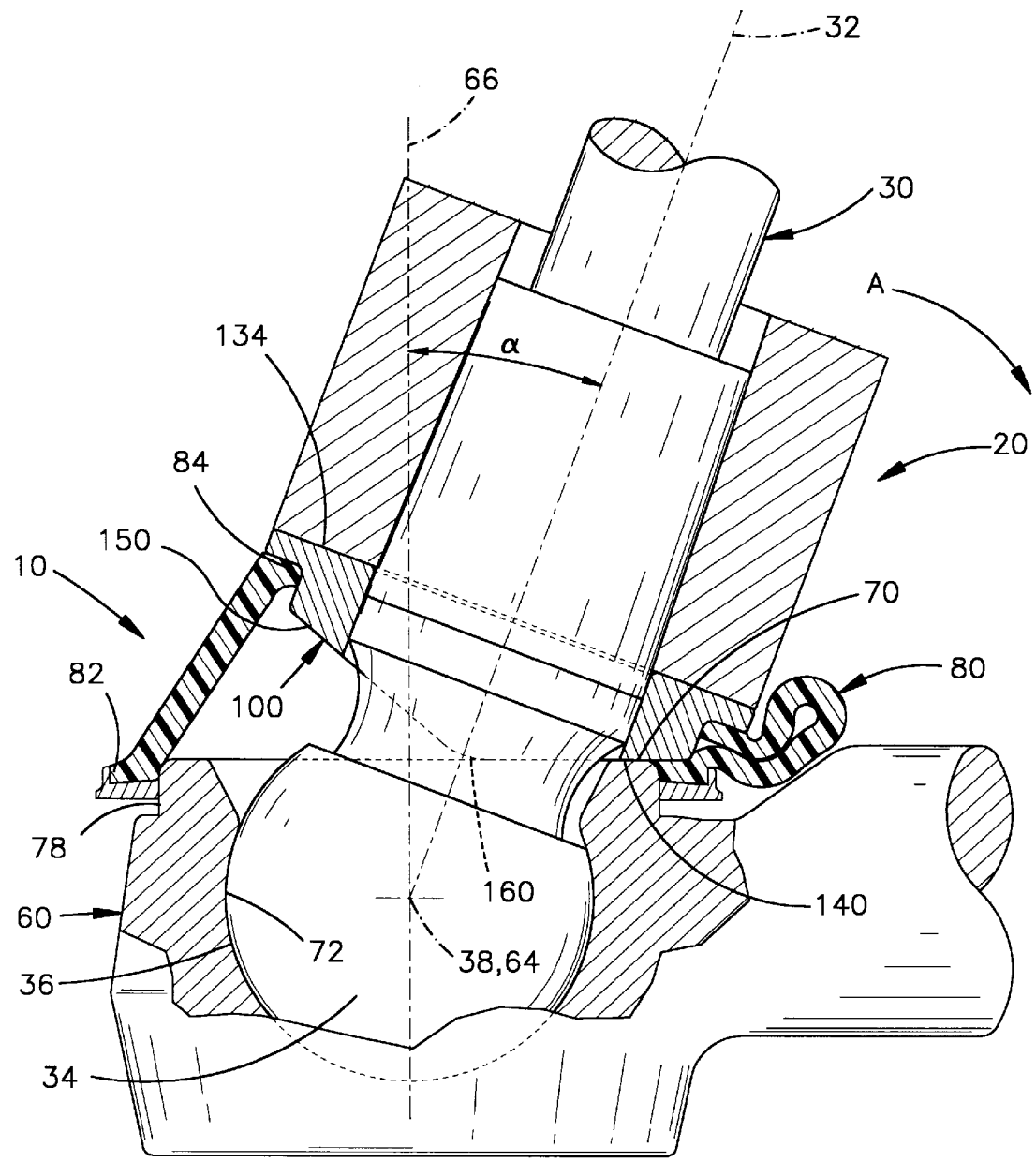
FIG. 6 is a view similar to FIG. 4 showing parts in different positions.

As shown in FIG. 6, during relative movement between the ball stud 30 and the socket member 60, the flexible body member 80 of the boot seal 10 resiliently deforms as necessary to accommodate such movement. The boot seal 10 including the flexible body member 80 maintains a seal between the ball stud 30 and the socket member 60 during such movement.

As noted above, the first and second bearing surfaces 160 and 170 are in contact with the outer end surface 70 of the socket member 60. When external forces, such as forces of a vehicle steering or suspension system, attempt to angularly move (or pivot) the ball stud 30 from the position shown in FIGS. 4 and 5 in a direction indicated by the arrow C (FIG. 5) which is perpendicular to the directions A and B, the engagement of the first and second bearing surfaces 160 and 170 of the insert 100 with the outer end surface 70 of the socket member 60 blocks such pivotal movement of the ball stud 30 in the direction C. The symmetrical design of the insert 100 likewise prevents the ball stud 30 from pivoting in a direction indicated by the arrow D (FIG. 5) which is opposite the direction C.

From the above description of the invention, those skilled in the art will perceive improvements, changes and modifications in the invention. For example, the bearing surfaces 160 and 170 of the insert 100 could be axially spaced apart from the outer surface 70 of the socket member 60 to allow for limited pivotal movement (e.g., 1°–2°) in the directions C and/or D. Also, the socket member 60 could be the component of the ball and socket joint 20 which is pivoted relative to the ball stud 30, rather than the ball stud being pivoted relative to the socket member as described above. Such improvements, changes and modifications within the skill of the art are intended to be covered by the appended claims.

Having described the invention, we claim the following:

1. An apparatus comprising:
   a ball stud having a ball end;
   a socket for receiving said ball end to form a ball and socket joint; and
   a boot seal having a first end portion for encircling and sealingly engaging a portion of said socket, said boot seal having a second end portion which defines an opening through which said ball stud extends;
   said second end portion of said boot seal having first means for permitting relative angular movement of said ball stud and said socket in a first direction and second means for blocking relative angular movement of said ball stud and said socket in a second direction.

2. An apparatus as set forth in claim 1 wherein said first direction is perpendicular to said second direction.

3. An apparatus as set forth in claim 1 wherein said boot seal includes an annular insert disposed in said opening in said second end portion of said boot seal, said insert having a surface that defines a bore and that sealingly engages said ball stud.

4. An apparatus as set forth in claim 3 wherein said insert is fixedly secured to said boot seal and includes means for supporting relative movement of said ball stud.

5. An apparatus as set forth in claim 3 wherein said insert includes a main body portion having first and second axial end portions, said second axial end portion having a planar end surface, said first axial end portion including a first stop surface lying in a first plane which extends at an angle to said planar end surface and a second stop surface lying in a second plane which extends at an angle to said planar end surface.

6. An apparatus as set forth in claim 5 wherein said main body portion of said insert includes first and second bearing surfaces which are co-planar, said first stop surface intersecting said second stop surface at said first and second bearing surfaces.

7. An apparatus as set forth in claim 6 wherein said first means comprises said first and second stop surfaces on a rigid portion of said insert, said first and second stop surfaces permitting a predetermined amount of relative angular movement of said ball stud and said socket in said first direction.

8. An apparatus as set forth in claim 7 wherein said second means comprises said first and second bearing surfaces on said rigid portion of said insert, said first and second bearing surfaces being engageable with surface portions of said socket to block said relative angular movement of said ball stud and said socket in said second direction.

9. An apparatus as set forth in claim 8 wherein each one of said first and second stop surfaces of said insert has a semi-elliptical configuration.

10. An apparatus comprising:
    a ball stud having a ball end;
    a socket for receiving said ball end to form a ball and socket joint;
    a flexible boot seal which encloses and seals the ball and socket joint, said boot seal having an end portion which defines an opening; and
    an annular insert disposed in said opening in said end portion of said boot seal, said insert having a surface that defines a bore and that sealingly engages said ball stud;
    said insert including first means for permitting relative pivotal movement between said ball stud and said socket in a first direction;
    said insert including second means for blocking relative pivotal movement between said ball stud and said socket in a second direction transverse to said first direction.

11. An apparatus as set forth in claim 10 wherein said first direction is perpendicular to said second direction.

12. An apparatus as set forth in claim 10 wherein said boot seal comprises a flexible seal member and said insert comprises a rigid member fixedly attached to said flexible seal member and fixed for movement with said flexible seal member.

13. An apparatus as set forth in claim 10 wherein said insert includes a main body portion having first and second axial end portions, said second axial end portion having a planar end surface, said first axial end portion including a first stop surface lying in a first plane which extends at an angle to said planar end surface and a second stop surface lying in a second plane which extends at an angle to said planar end surface.

14. An apparatus as set forth in claim 13 wherein said main body portion of said insert includes first and second bearing surfaces which are co-planar, said first stop surface intersecting said second stop surface at said first and second bearing surfaces.

15. An apparatus as set forth in claim 14 wherein said first means comprises said first and second stop surfaces of said insert, said first and second stop surfaces permitting a predetermined amount of relative angular movement of said ball stud and said socket in said first direction.

16. An apparatus as set forth in claim 15 wherein said second means comprises said first and second bearing surfaces of said insert, said first and second bearing surfaces being in contact with surface portions of said socket to block said relative movement upon relative angular movement of said ball stud and said socket in said second direction.

\* \* \* \* \*